United States Patent
Kosako et al.

(10) Patent No.: US 7,178,200 B2
(45) Date of Patent: Feb. 20, 2007

(54) HINGE STRUCTURE

(75) Inventors: Kosei Kosako, Tokyo (JP); Ken Endo, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/404,054

(22) Filed: Apr. 2, 2003

(65) Prior Publication Data

US 2003/0200626 A1     Oct. 30, 2003

(30) Foreign Application Priority Data

Apr. 8, 2002   (JP)   ............................. 2002-105098

(51) Int. Cl.
  *E05C 17/64*   (2006.01)
  *E05D 11/08*   (2006.01)
(52) U.S. Cl. ............................. 16/337; 16/342; 16/386
(58) Field of Classification Search ................ 16/337, 16/342, 386, 387, 380, 381; 348/333.01, 348/333.06, 375, 373
See application file for complete search history.

(56) References Cited

U.S. PATENT DOCUMENTS

| | | | | | |
|---|---|---|---|---|---|
| 197,333 | A | * | 11/1877 | Clark | 16/381 |
| 737,360 | A | * | 8/1903 | Daly | 403/154 |
| 1,030,801 | A | * | 6/1912 | Berault | 16/262 |
| 3,068,508 | A | * | 12/1962 | Heyer | 16/386 |
| 3,188,686 | A | * | 6/1965 | Orcutt | 16/263 |
| 3,594,073 | A | * | 7/1971 | Liautaud | 351/45 |
| 4,175,315 | A | * | 11/1979 | Hayes et al. | 29/453 |
| 5,364,149 | A | * | 11/1994 | Aymerich et al. | 296/97.12 |
| 5,500,982 | A | * | 3/1996 | Hosoi | 16/297 |
| 5,715,575 | A | * | 2/1998 | Kubota | 16/342 |
| 5,765,263 | A | * | 6/1998 | Bolinas et al. | 16/342 |
| 5,790,193 | A | * | 8/1998 | Ohmori | 348/375 |
| 5,918,348 | A | * | 7/1999 | Carpenter et al. | 16/342 |
| 6,035,491 | A | * | 3/2000 | Hartigan et al. | 16/342 |
| 6,067,116 | A | * | 5/2000 | Yamano et al. | 348/372 |
| 6,119,310 | A | * | 9/2000 | Ohshima et al. | 16/342 |
| 6,317,928 | B1 | * | 11/2001 | Guillemette | 16/353 |

FOREIGN PATENT DOCUMENTS

| | | | |
|---|---|---|---|
| CH | 626683 | A5 * | 11/1981 |
| JP | 11247837 | A  * | 9/1999 |
| JP | 11257343 | A  * | 9/1999 |

* cited by examiner

*Primary Examiner*—Chuck Y. Mah
(74) *Attorney, Agent, or Firm*—Greenblum & Bernstein, P.L.C.

(57) ABSTRACT

A hinge structure for mounting a swingable member which is swingable relative to a body member, includes a first knuckle formed on the swingable member, a second knuckle formed on the body member coaxial with the first knuckle, and a pivot pin extending through the first and second knuckles to join the first and second knuckles to each other. The pivot pin is provided with a radial projection formed at one end thereof to extend radially outwards, a width of the radial projection being smaller than a diameter of the pivot pin. One of the first and second knuckles is provided with at least one groove which is formed at one end thereof, wherein the radial projection is fitted into the groove to prevent the pivot from rotating relative to the one of the first and second knuckles.

14 Claims, 5 Drawing Sheets

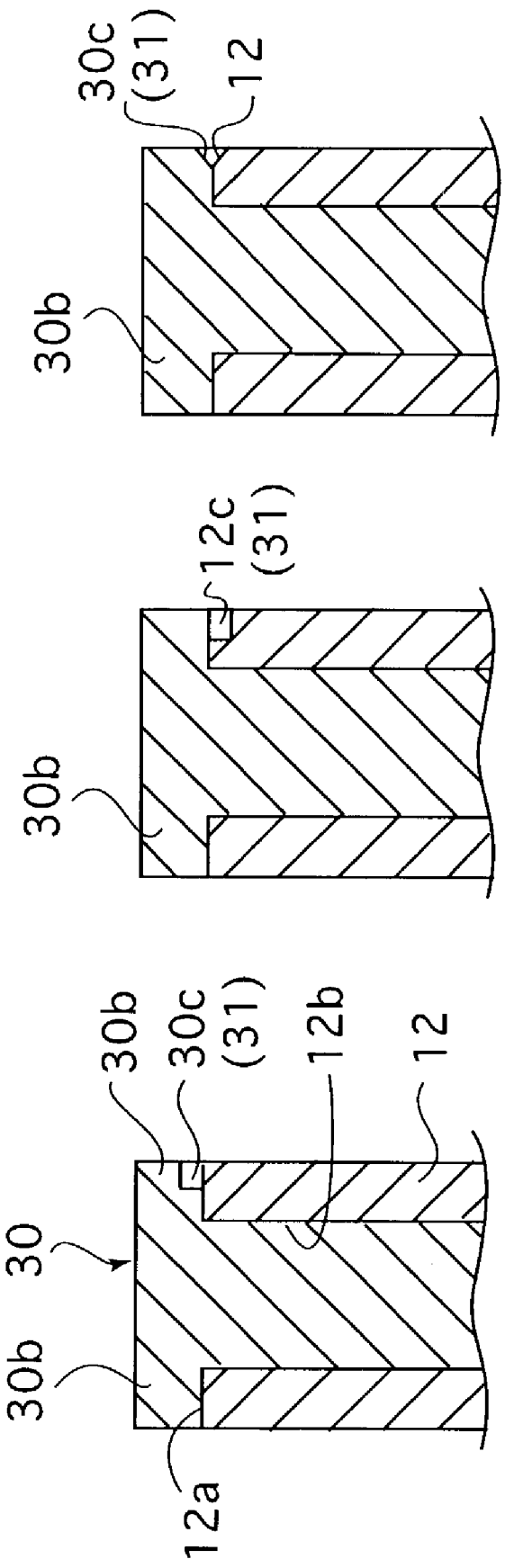

HINGE STRUCTURE

BACKGROUND OF THE INVENTION

1. Field of the Invention

The present invention relates to a hinge structure for swingably mounting a first member relative to a second member.

2. Description of the Related Art

A type of opening-and-closing mechanism using a hinge structure for swingably mounting a swingable member which opens and closes relative to an apparatus body, wherein a first knuckle formed on the body and a second knuckle formed on the swingable member are coaxially arranged while a metal pivot pin is inserted into the first and second knuckles to extend therethrough, is widely known in the art.

In this type of opening-and-closing mechanism, it is desirable for the diameters of the first and second knuckles to be reduced as small as possible to miniaturize the mechanism and that a resistance (load) to the swingable member when the swingable member rotates be stabilized as much as possible.

SUMMARY OF THE INVENTION

The present invention provides a hinge structure which makes it possible to reduce the diameters of the aforementioned first and second knuckles. The present invention further provides a hinge structure which can provide a stable resistance to the aforementioned swingable member when it rotates.

According to an aspect of the present invention, a hinge structure for mounting a swingable member which is swingable relative to a body member is provided, including a first knuckle formed on the swingable member, a second knuckle formed on the body member so as to be coaxial with the first knuckle, and a pivot pin extending through the first knuckle and the second knuckle to join the first knuckle and the second knuckle to each other. The pivot pin is provided with at least one radial projection formed at one end thereof to extend radially outwards, a width of the radial projection being smaller than a diameter of the pivot pin. One of the first knuckle and the second knuckle is provided with at least one groove which is formed at one end of the one of the first knuckle and the second knuckle, wherein the radial projection is fitted into the groove to prevent the pivot from rotating relative to the one of the first knuckle and the second knuckle.

With the radial projection each having a width smaller than the diameter of the pivot pin, the width of each of the groove, into which the radial projection is fitted, accordingly becomes small. As a result, a sufficient strength of the knuckle (the first or second knuckle) on which the groove is formed can be secured with a sufficient wall thickness even if the diameter of the knuckle is reduced. Consequently, each of the first and second knuckles can be minimized in diameter.

The present invention becomes effective if each of the first and second knuckles is made of synthetic resin, which is generally difficult to secure a sufficient strength.

The pivot pin can be made of metal, and each of the swingable member and the body member can be made of synthetic resin.

The radial projection can be at least two and a maximum of four radial projections, arranged at equi-angular intervals about an axis of the pivot pin.

At least one of the radial projection of the pivot pin and the one of the first knuckle and the second knuckle can include a recess formed on at least one of the radial projection and a surface of the one of the first knuckle and the second knuckle, at a bottom of the groove, to form an axial gap between the radial projection and the surface.

It is desirable for the hinge structure to further include a frictional member fitted in the other of the first knuckle and the second knuckle to be in pressing contact with the pivot pin.

The hinge structure can be incorporated in a camera having a camera body and a display member hinged on the camera body via the hinge structure, wherein the swingable member constitutes a casing of the display member, and the body member constitutes a casing of the camera body.

It is desirable for the frictional member to be a metal leaf spring.

In another embodiment, a hinge structure for mounting a swingable member which is swingable relative to a body member is provided, including a first knuckle formed on the swingable member, a second knuckle formed on the body member so as to be coaxial with the first knuckle, a pivot pin extending through the first knuckle and the second knuckle to join the first knuckle and the second knuckle to each other, the pivot pin being fixed to one of the first knuckle and the second knuckle so as to be prevented from rotating, and a frictional member fitted into the other of the first knuckle and the second knuckle, the frictional member including at least two contact wall portions which are in linear contact with a shaft portion of the pivot pin along an axial direction of the pivot pin.

It is desirable for the pivot pin to be made of metal.

It is desirable for each of the frictional member and an inner peripheral surface of the other of the first knuckle and the second knuckle to have a non-cylindrical shape to prevent the frictional member and the other of the first knuckle and the second knuckle from rotating relative to each other.

The frictional member can be a leaf spring which is bent to be shaped into a substantially polygonal hollow tube.

The leaf spring can include a plurality of side walls, each of which is curved to project toward the shaft portion of the pivot pin.

The hinge structure can be incorporated in a camera having a camera body and a display member hinged on the camera body via the hinge structure, wherein the swingable member constitutes a casing of the display member, and the body member constitutes a casing of the camera body.

In another embodiment, a camera having a camera body and a swingable component hinged on the camera body is provided, including a hinge structure having a first knuckle fixed to the swingable component and a second knuckle fixed to the camera body coaxial with the first knuckle, and a pivot pin extending through the first knuckle and the second knuckle to join the first knuckle and the second knuckle to each other. The pivot pin includes at least one radial projection formed at one end of the pivot pin to extend radially outwards, a width of each the radial projection being smaller than a diameter of the pivot pin. One of the first knuckle and the second knuckle is provided with at least one groove which is formed at one end of the one of the first knuckle and the second knuckle, wherein the radial projection is fitted into the groove to prevent the pivot pin to rotate relative to the one of the first knuckle and the second knuckle.

The camera can be a digital camera, and the swingable component can be a display panel.

The groove can be a plurality of grooves arranged at equi-angular intervals about an axis of the pivot pin, and the radial projections can include a corresponding plurality of radial projections arranged at equi-angular intervals about the axis of the pivot pin to be fitted into the plurality of grooves, respectively.

The present disclosure relates to subject matter contained in Japanese Patent Application No. 2002-105098(filed on Apr. 8, 2002) which is expressly incorporated herein by reference in its entirety.

BRIEF DESCRIPTION OF THE DRAWINGS

The present invention will be described below in detail with reference to the accompanying drawings in which:

FIG. 9A is a cross sectional view taken along IX—IX line shown in FIG. 8;

FIG. 9B is a view similar to that of FIG. 9A and illustrates another embodiment of a fundamental portion of the hinge structure; and FIG. 9C is a view similar to that of FIG. 9A and illustrates another embodiment of the fundamental portion of the hinge structure.

DESCRIPTION OF THE PREFERRED EMBODIMENTS

Figure 4:
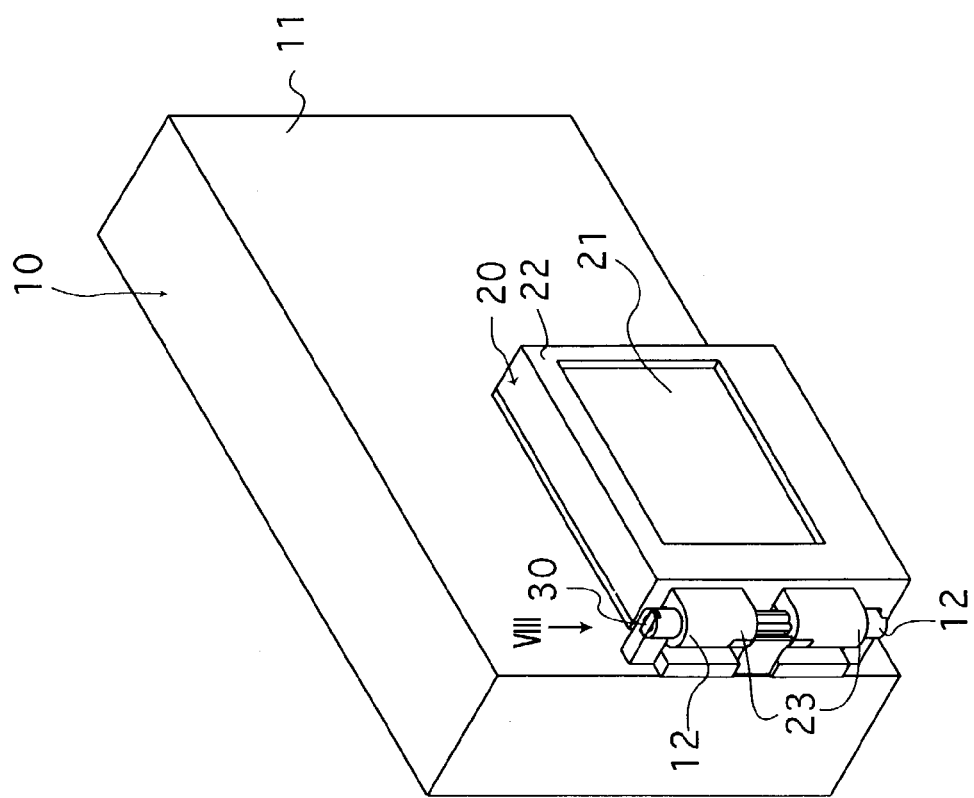
FIG. 4 is a view similar to that of FIG. 3 and illustrates a state where the display member is hinged on a casing of a camera body with the-metal-pivot pin.
Figure 3:
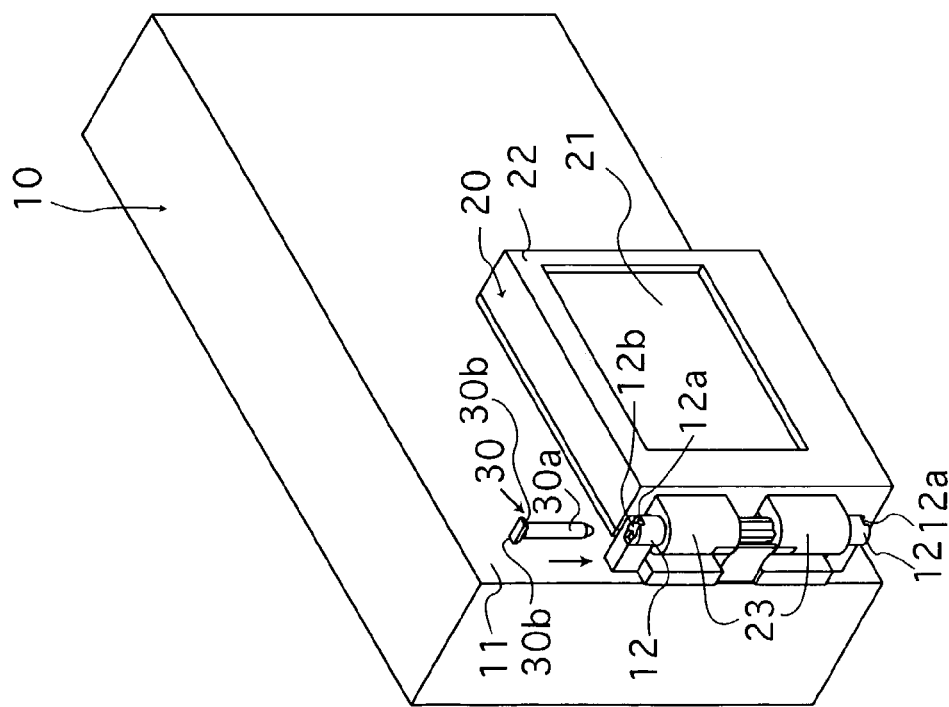
FIG. 3 is a perspective view of the digital camera having the display member shown in FIGS. 1 and 2, showing a state where a metal pivot pin serving as an element of the hinge structure of the digital camera is removed.

FIGS. 3 and 4 show an embodiment of a digital camera having a hinge structure according to the present invention. The digital camera is provided with a camera body 10 and a flat-panel display member (swingable member/swingable component) 20 which is hinged on the camera body 10 via the hinge structure according to the present invention.

Although one of the camera body 10 and the flat-panel display member 20 is swingable relative to the other, the camera body 10 and the flat-panel display member 20 are hereinafter referred to as a body 10 and a swingable member 20, respectively, for the sake of expediency.

Figure 2:
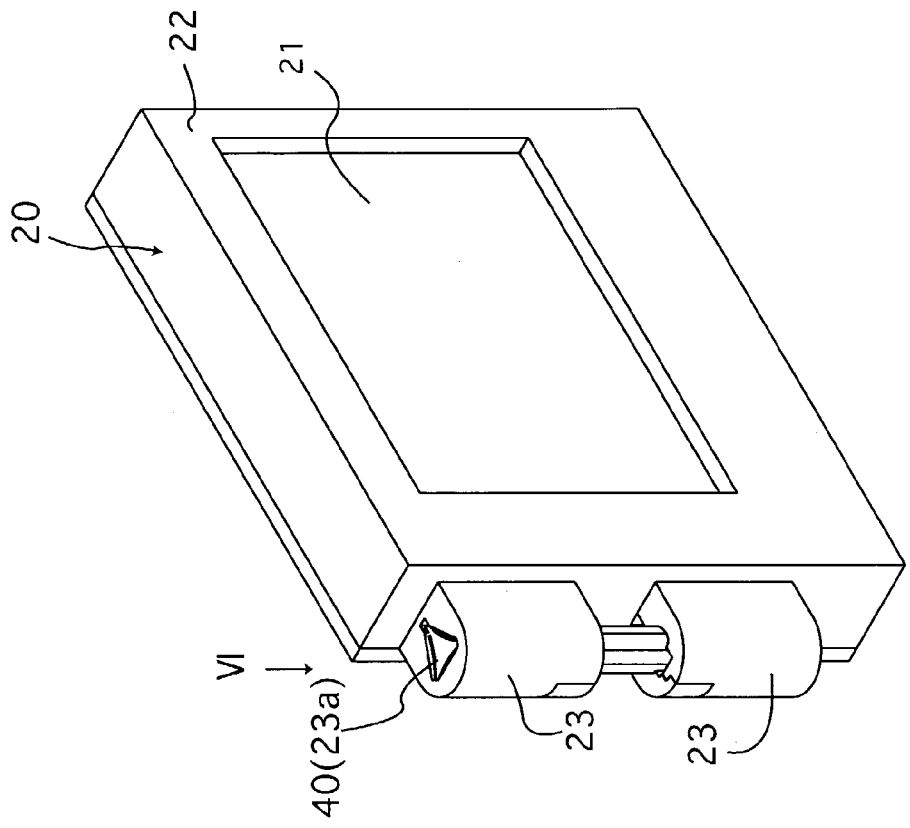
FIG. 2 is a perspective view of the display member and the frictional member shown in FIG. 1 with the frictional member fitted into an upper knuckle portion of the display member.
Figure 1:
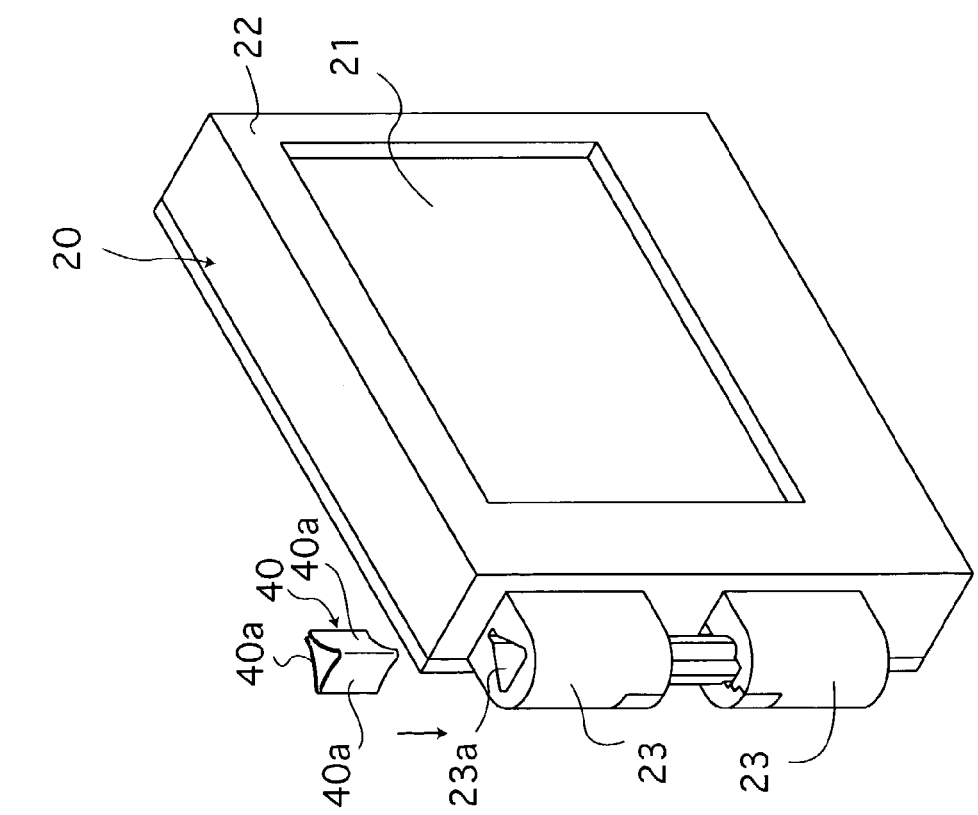
FIG. 1 is a perspective view of a swingable display member and a frictional member which are components of an embodiment of a digital camera having a hinge structure according to the present invention.

The swingable member 20, a perspective view of which is shown in FIGS. 1 and 2, is provided with an LCD panel 21 and a casing 22 which holds the LCD panel 21. The casing 22 is made of synthetic resin. The casing 22 is provided with a pair of first knuckles (upper and lower knuckles) 23 which are integrally formed with the casing 22. The pair of first knuckles 23 extend horizontally from a vertical side wall of the casing 22 with a vertical gap therebetween so that the respective axes are coaxially arranged.

A casing 11 of the body 10, which is made of synthetic resin, is provided with a pair of second knuckles (upper and lower knuckles) 12 which are integrally formed with the casing 11. The pair of second knuckles 12 extend horizontally from a back side wall of the casing 11 with a gap therebetween so that the respective axes thereof are coaxially arranged. The upper knuckle 12 is positioned immediately above the upper knuckle 23 while the lower knuckle 12 is positioned immediately below the lower knuckle 23. In a state shown in FIG. 4 where the swingable member 20 is correctly hinged on the casing 11, the pair of first knuckles 23 and the pair of second knuckles 12 are coaxially arranged. The upper knuckle of the pair of first knuckles 23 and the upper knuckle of the pair of second knuckles 12, i.e. an upper pair of knuckles, are hinged with a metal pivot pin (pivot shaft/upper pivot pin) 30 which is inserted into respective axial holes of the upper knuckles from the top of the upper knuckle of the pair of second knuckles 12. Likewise, the lower knuckle of the pair of first knuckles 23 and the lower knuckle of the pair of second knuckles 12, i.e. a lower pair of knuckles, are hinged with another metal pivot pin (pivot shaft, lower pivot pin) 30 which is inserted into respective axial holes of the two lower knuckles from below the lower knuckle of the pair of second knuckles 12. The upper knuckles 12 and 23 that are joined to each other by the upper pivot pin 30 and the lower knuckles 12 and 23 that are joined to each other by the lower pivot pin 30 are symmetrically arranged with respect to a horizontal plane. The pair of first knuckles 23, the pair of second knuckles 12 and the upper and lower pivot pins 30 are fundamental elements of the hinge structure according to the present invention. Since an upper half of the hinge structure, which includes the upper knuckles 12 and 23 and the upper pivot pin 30, and a lower half of the hinge structure, which includes the lower knuckles 12 and 23 and the lower pivot pin 30, are symmetrical, only the upper half of the hinge structure will be hereinafter discussed for the sake of simplifying the following descriptions of the hinge structure.

Figure 5:
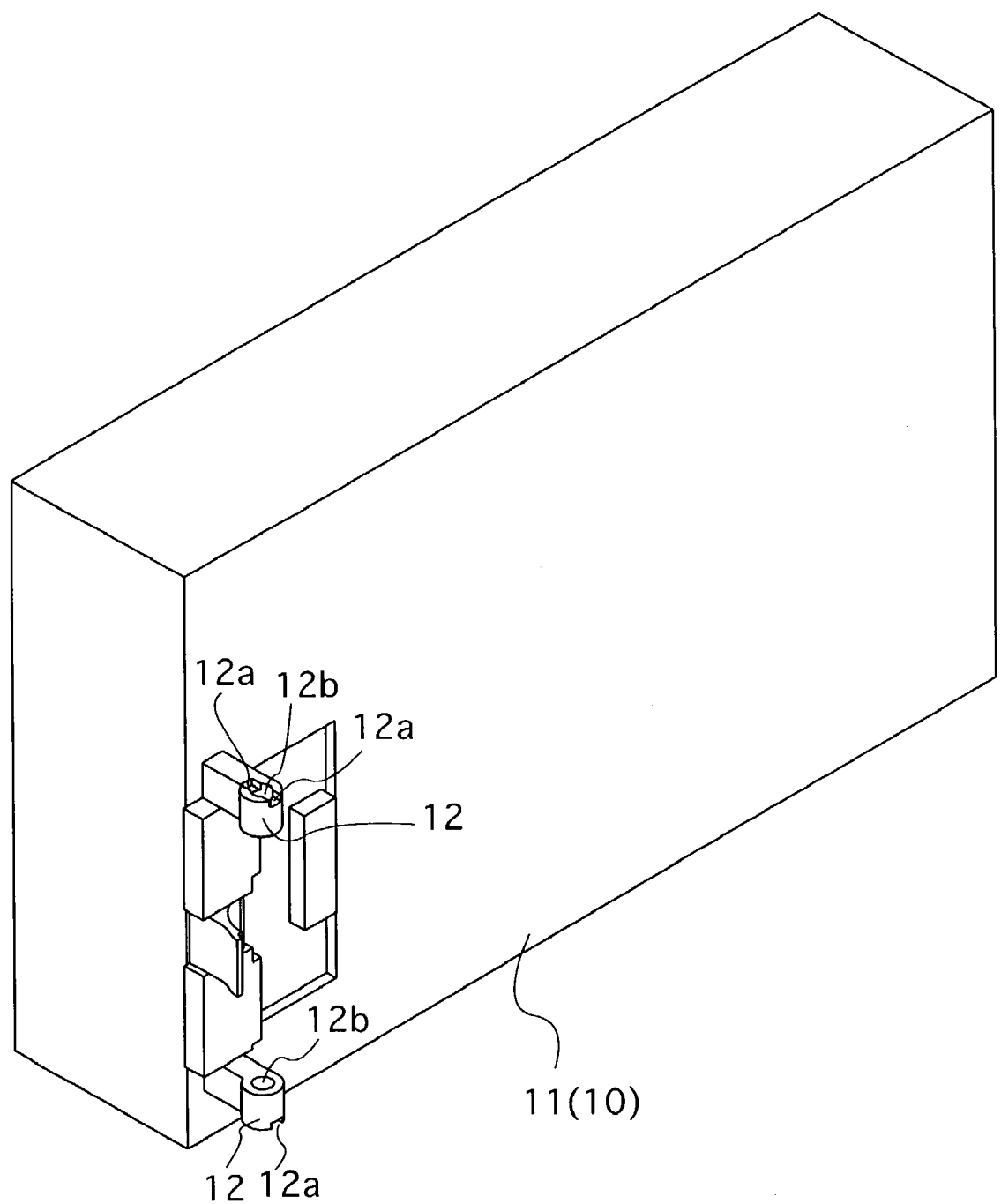
FIG. 5 is a perspective view of the camera body of the digital camera shown in FIGS. 3 and 4.
Figure 6:
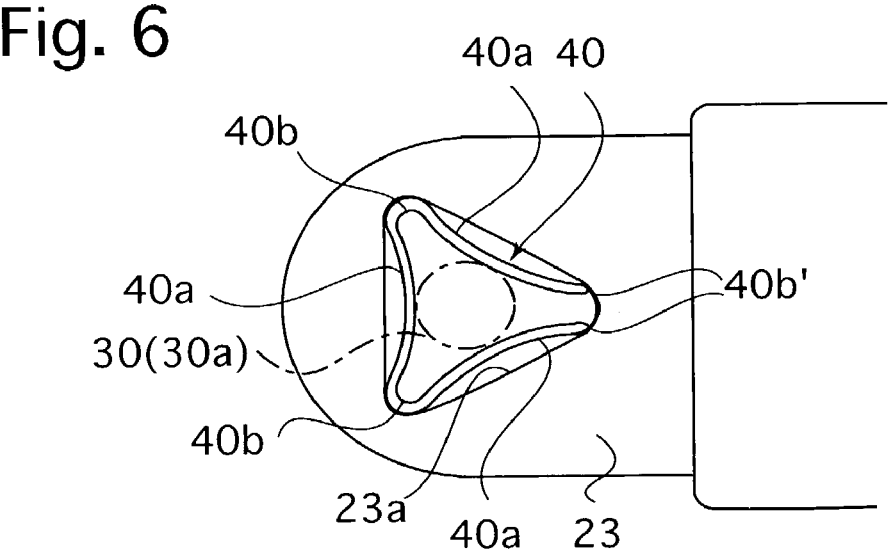
FIG. 6 is a plan view of a fundamental portion of the digital camera, as viewed in the direction of an arrow VI shown in FIG. 2.

As shown in FIGS. 1, 2 and 6, a frictional member 40 is fitted into an axial hole 23a of the knuckle 23 of the swingable member 20 before the pivot pin 30 is inserted into the axial hole 23a. The frictional member 40 is made of a metal leaf spring which is bent to have the shape of a substantially hollow triangular tube. More specifically, as clearly shown in FIG. 6, each of three side walls 40a constituting the metal leaf spring of the frictional member 40 is slightly curved inwards so as to come into pressing contact with a cylindrical shaft portion 30a (see FIG. 3) of the pivot pin 30 when the cylindrical shaft portion 30a is inserted into the frictional member 40. Each of the three side walls 40a are in linear contact with the cylindrical shaft portion 30a along the axial direction of the pivot pin 30. The axial hole 23a of the knuckle 23 has a substantially triangular cross section corresponding to the shape of the frictional member 40. This structure prevents the frictional member 40 from rotating in the axial hole 23a relative to the knuckle 23. At the same time, when each of the three side walls 40a is resiliently deformed by an insertion of the shaft portion 30a of the pivot pin 30 into the frictional member 40, two horizontal ridges 40b and two horizontal edges 40b' are firmly pressed against an inner surface of the knuckle 23 in the axial hole 23a with substantially no play between the frictional member 40 and the inner surface of the knuckle 23. The knuckle 12 of the body 10 has an axial hole 12b into which the shaft portion 30a of the pivot pin 30 is inserted, as shown in FIG. 5. The axial hole 12b has a circular cross section the diameter of which is substantially identical to the diameter of the shaft portion 30a of the pivot pin 30.

Figure 8:
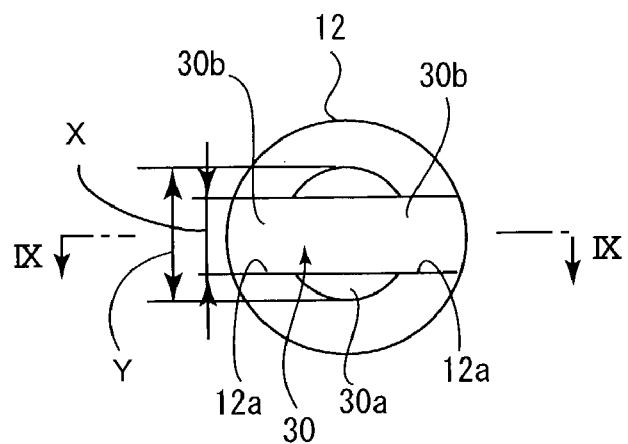
FIG. 8 is a plan view of a fundamental portion of the digital camera, as viewed in the direction of an arrow VIII shown in FIG. 4.

The pivot pin 30 is provided at an end of the shaft portion 30a with a set of two radial projections 30b extending radially outwards in opposite directions (see FIGS. 3 and 8). As shown in FIG. 8, the width X of each radial projection 30b is smaller than the diameter Y of the shaft portion 30a. The knuckle 12 of the body 10 is provided with a set of two stop grooves 12a into which the set of two radial projections 30b are fitted when the shaft portion 30a of the pivot pin 30 is inserted into the axial hole 12a. In the case where each radial projection 30b, which is formed at an end of the shaft portion 30a, is formed to have the width X smaller than the diameter Y of the shaft portion 30a in such a manner, the width of each stop groove 12a accordingly becomes small. Consequently, sufficient strength of the knuckle 12 of the body 10 can be secured with a sufficient wall thickness of a sectional area excluding the axial hole 12b and the stop groove 12a, even if the diameter of the knuckle 12 is reduced. This can be easily understood from the assumption that the thickness of a portion of the knuckle 12 other than the stop groove 12a becomes small to thus make it difficult to ensure a sufficient strength of the knuckle 12 if the width X of each radial projection 30b is equal to or greater than the diameter Y of the shaft portion 30a.

As shown in FIG. 9A, the pivot pin 30 is provided on one of the set of two radial projections 30b with a recess 30c for forming an axial gap 31 between the radial projection 30b and a surface of the knuckle 12 in the associated stop groove 12a. The pivot pin 30 can be easily pulled out even after being firmly and entirely inserted into the axial hole 12b of the knuckle 12 due to the presence of the axial gap 31. To achieve the same effect, a recess 12c corresponding to the recess 30c can be formed on a surface of the knuckle 12 at the bottom of one of the set of two stop grooves 12a as shown in FIG. 9B, or the two recesses 30c and 12c can be formed together on the pivot pin 30 and the knuckle 12 to be communicatively connected to each other as shown in FIG. 9C.

In an assembling process of the above described hinge structure, firstly the frictional member 40 is fitted into the axial hole 23a of the knuckle 23 of the swingable member 20. Subsequently, in a state where the knuckle 12 of the body 10 and the knuckle 23 of the swingable member 20 are coaxially arranged (as shown in FIG. 3), the pivot pin 30 is inserted into the coaxial knuckles 12 and 23 so that the shaft portion 30a of the pivot pin 30 extend through the knuckle 12 and the frictional member 40 fitted into the knuckle 23. Upon the insertion of the pivot pin 30, the three side walls 40a of the frictional member 40 are resiliently deformed radially outwards by an amount equivalent to the diameter of the shaft portion 30a of the pivot pin 30. This produces moderate friction between the shaft portion 30a and the frictional member 40 when the frictional member 40 rotates about the shaft portion 30a. This ensures a stable and moderate resistance (load) to the hinged portion between the body 10 and the swingable member 20.

Figure 7A:
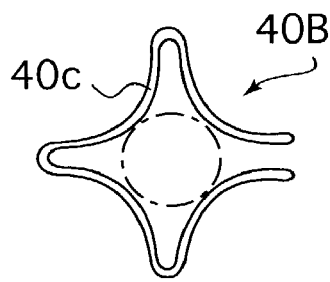
FIG. 7A is a plan view of another embodiment of the frictional member.

FIG. 7A shows another embodiment of the frictional member to be fitted into the axial hole 23a of the knuckle 23 of the swingable member 20. In this embodiment, a frictional member 40B is made of a metal leaf spring which is bent to have the shape of a substantially rectangular (polygonal) hollow tube. More specifically, each of four side walls 40c constituting the metal leaf spring of the frictional member 40B is curved inwards so as to come into pressing contact with the shaft portion 30a of the pivot pin 30 when the shaft portion 30a is inserted into the frictional member 40B. In this case, the axial hole 23a of the knuckle 23 is formed to have a substantially square cross section corresponding to the shape of the frictional member 40B.

Figure 7B:
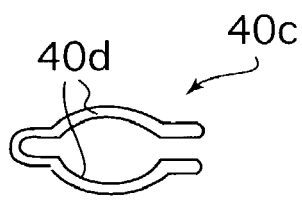
FIG. 7B is a plan view of another embodiment of the frictional member.

FIG. 7B shows another embodiment of the frictional member to be fitted into the axial hole 23a of the knuckle 23 of the swingable member 20. In this embodiment, the frictional member 40C is made of a metal leaf spring which is bent to have a substantially U-shaped cross section. More specifically, each of two side walls 40d comprising the metal leaf spring of the frictional member 40C is curved to have a substantially circular-arc cross section. In this case, the axial hole 23a of the knuckle 23 is formed to have a cross section corresponding to the shape of the frictional member 40C.

Although the set of two radial projections 30b are formed at one end of the pivot pin 30 to extend radially outwards in opposite directions from an axial center of the shaft portion 30a in the above illustrated embodiment, it is sufficient if only one radial projection corresponding to each of the set of two radial projections 30b is formed on the pivot pin 30 to achieve the same effect. Alternatively, a set of more than two radial projections each corresponding to each of the set of two radial projections 30b can be formed on the pivot pin 30 at equi-angular intervals. In this case, the set of stop grooves 12a are formed to correspond to the set of radial projections to receive the set of radial projections, respectively. Specifically, it is desirable that a set of two through four radial projections each corresponding to each of the set of two radial projections 30b be formed on the pivot pin 30 at equi-angular intervals. This ensures sufficient strength of the pivot pin 30 and the knuckle 12 while achieving a balanced strength therebetween.

Although the hinge structure devised according to the present invention is applied to a digital camera in the above illustrated embodiment, the hinge structure can also be applied to a camcorder or any other type of instrument or device.

As can be understood from the above description, the respective diameters of at least one knuckle formed on a body of an apparatus and at least one knuckle formed on a swingable member hinged on the body of the apparatus can be reduced. Moreover, a hinge structure which can provide a stable resistance to the swingable member when it rotates can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A hinge structure for mounting a swingable member which is swingable relative to a body member, comprising:
a first knuckle formed on said swingable member;
a second knuckle formed on said body member so as to be coaxial with said first knuckle; and
a pivot pin extending through said first knuckle and said second knuckle to join said first knuckle and said second knuckle to each other;

wherein said pivot pin is provided with at least one radial projection formed at one end thereof to extend radially outwards in a first direction, a width of said radial projection in a second direction, perpendicular to said first direction, being smaller than a diameter of said pivot pin;

wherein one of said first knuckle and said second knuckle is provided with at least one groove which is formed in one end surface of said one of said first knuckle and said second knuckle, wherein said radial projection is fitted into said groove to prevent said pivot pin from rotating relative to said one of said first knuckle and said second knuckle, said radial projection being received into said groove in such a manner that a top surface of said radial projection does not extend beyond said one end surface of said one of said first knuckle and said second knuckle, and wherein said radial projection extends within said groove to an outer periphery of said one of said first knuckle and said second knuckle;

wherein said at least one groove comprises a plurality of grooves arranged at equi-angular intervals about an axis of said pivot pin; and wherein said at least one radial projection comprises a corresponding plurality of radial projections arranged at equi-angular intervals about said axis of said pivot pin to be fitted into said plurality of grooves, respectively.

2. The hinge structure according to claim 1, wherein said pivot pin is made of metal, and each of said swingable member and said body member is made of synthetic resin.

3. The hinge structure according to claim 1, further comprising a recess formed on at least one of said radial projection and a surface of said one of said first knuckle and said second knuckle, at a bottom of said groove, to form an axial gap between said radial projection and said surface.

4. The hinge structure according to claim 1, further comprising a frictional member fitted in the other of said first knuckle and said second knuckle to be in pressing contact with said pivot pin.

5. The hinge structure according to claim 4, wherein said frictional member comprises a metal leaf spring.

6. The hinge structure according to claim 1, wherein said hinge structure is incorporated in a camera having a camera body and a display member hinged on said camera body via said hinge structure;

wherein said swingable member constitutes a casing of said display member; and wherein said body member constitutes a casing of said camera body.

7. A camera having a camera body and a swingable component hinged on said camera body, comprising:

a hinge structure having a first knuckle fixed to said swingable component and a second knuckle fixed to said camera body coaxial with said first knuckle; and a pivot pin extending through said first knuckle and said second knuckle to join said first knuckle and said second knuckle to each other;

wherein said pivot pin comprises at least one radial projection formed at one end of said pivot pin to extend radially outwards in a first direction, a width of said radial projection in a second direction, perpendicular to said first direction, being smaller than a diameter of said pivot pin;

wherein one of said first knuckle and said second knuckle is provided with at least one groove which is formed in one end surface of said one of said first knuckle and said second knuckle, wherein said radial projection is fitted into said groove to prevent said pivot pin from rotating relative to said one of said first knuckle and said second knuckle, said radial projection being received into said groove in such a manner that a top surface of said radial projection does not extend beyond said one end surface of said one of said first knuckle and said second knuckle, and wherein said radial projection extends within said groove to an outer periphery of said one of said first knuckle and said second knuckle;

wherein said at least one groove comprises a plurality of grooves arranged at equi-angular intervals about an axis of said pivot pin; and wherein said at least one radial projection comprises a corresponding plurality of radial projections arranged at equi-angular intervals about said axis of said pivot pin to be fitted into said plurality of grooves, respectively.

8. The camera according to claim 7, wherein said camera comprises a digital camera, and said swingable component comprises a display panel.

9. The camera according to claim 7, wherein said pivot pin is made of metal.

10. The camera according to claim 7, further comprising a recess formed on at least one of said radial projection and a surface of said one of said first knuckle and said second knuckle, at a bottom of said groove, to form an axial gap between said radial projection and said surface.

11. The camera according to claim 7, further comprising a frictional member fitted in the other of said first knuckle and said second knuckle to be in pressing contact with said pivot pin.

12. The camera according to claim 11, wherein said frictional member comprises a metal leaf spring.

13. A hinge structure for mounting a swingable member which is swingable relative to a body member, comprising:

a first knuckle formed on said swingable member;

a second knuckle formed on said body member so as to be coaxial with said first knuckle; and a pivot pin extending through said first knuckle and said second knuckle to join said first knuckle and said second knuckle to each other;

wherein said pivot pin is provided with at least one radial projection formed at one end thereof to extend radially outwards in a first direction, a width of said radial projection in a second direction, perpendicular to said first direction, being smaller than a diameter of said pivot pin; and wherein one of said first knuckle and said second knuckle is provided with at least one groove which is formed in one end surface of said one of said first knuckle and said second knuckle, wherein said radial projection is fitted into said groove to prevent said pivot pin from rotating relative to said one of said first knuckle and said second knuckle, said radial projection being received into said groove in such a manner that a top surface of said radial projection does not extend beyond said one end surface of said one of said first knuckle and said second knuckle, and wherein said radial projection extends within said groove to an outer periphery of said one of said first knuckle and said second knuckle.

14. A camera having a camera body and a swingable component hinged on said camera body, comprising:

a hinge structure having a first knuckle fixed to said swingable component and a second knuckle fixed to said camera body coaxial with said first knuckle; and a pivot pin extending through said first knuckle and said second knuckle to join said first knuckle and said second knuckle to each other;

wherein said pivot pin comprises at least one radial projection formed at one end of said pivot pin to extend radially outwards in a first direction, a width of said radial projection in a second direction, perpendicular to said first direction, being smaller than a diameter of said pivot pin; and wherein one of said first knuckle and said second knuckle is provided with at least one groove which is formed in one end surface of said one of said first knuckle and said second knuckle, wherein said radial projection is fitted into said groove to prevent said pivot pin from rotating relative to said one of said first knuckle and said second knuckle, said radial projection being received into said groove in such a manner that a top surface of said radial projection does not extend beyond said one end surface of said one of said first knuckle and said second knuckle, and wherein said radial projection extends within said groove to an outer periphery of said one of said first knuckle and said second knuckle.

* * * * *